Sept. 21, 1971     N. C. ATKINS     3,606,775
SURFACE BOLT

Filed Aug. 17, 1970     2 Sheets-Sheet 1

INVENTOR
NORMAN C. ATKINS
BY J. Warren Kinney Jr.
ATTORNEY

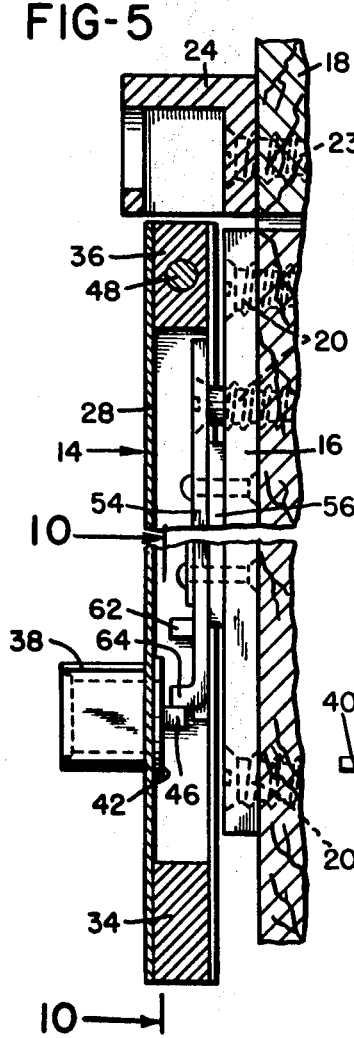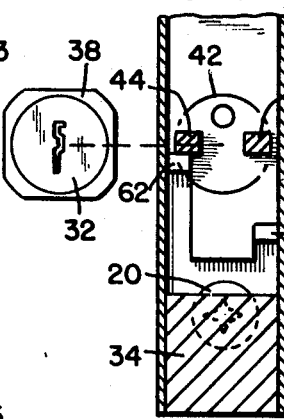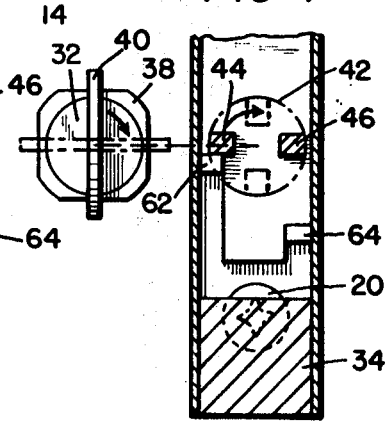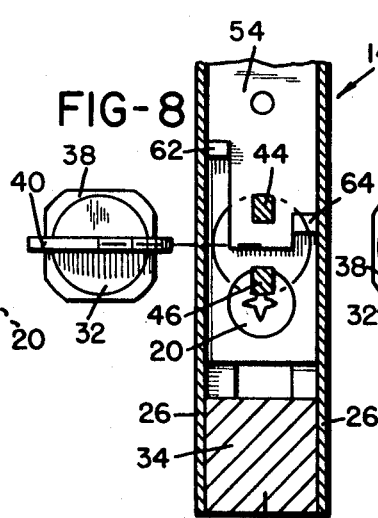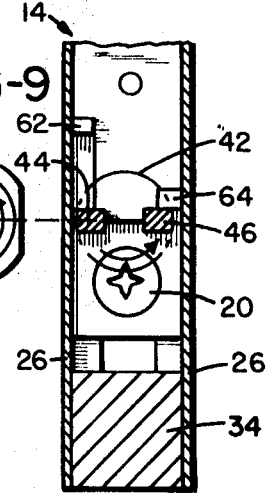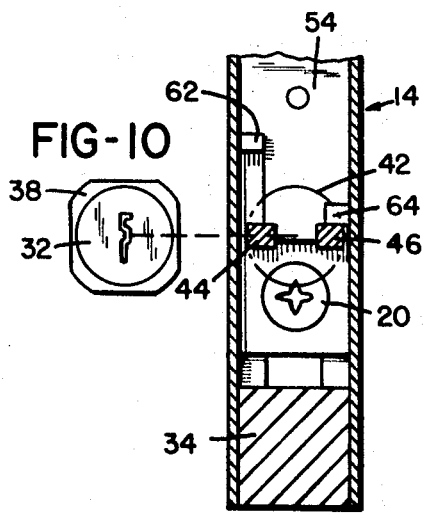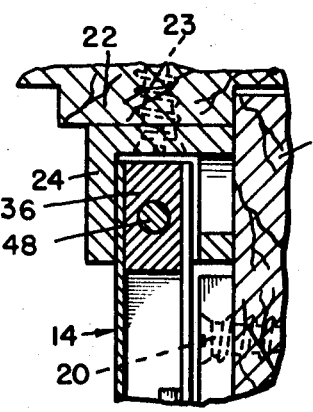

United States Patent Office
3,606,775
Patented Sept. 21, 1971

3,606,775
SURFACE BOLT
Norman C. Atkins, Franklin Park, Ill., assignor to
Glenraven Corporation, Chicago, Ill.
Filed Aug. 17, 1970, Ser. No. 64,238
Int. Cl. E05b 65/06
U.S. Cl. 70—129                                   22 Claims

ABSTRACT OF THE DISCLOSURE

The lock housing of the slidable bolt member of a surface bolt constitutes a handle by which the bolt is manually shiftable from extended, locked to retracted, unlocked positions, the lock housing containing a lock mechanism adapted to secure the bolt in either a fully locked or in a fully unlocked position only when the key to the locking mechanism has been removed from the lock.

BACKGROUND OF THE INVENTION

Surface bolts have heretofore been provided with manually slidable bolt members which are adapted to be locked only in an extended, fully locked position by means of a key-actuated lock such as, by way of example, the slide bolt and locking mechanism of U.S. Pat. 2,722,819 to Holmsten. The bolt members of such surface bolts have, however, been the subject to the inherent disadvantage that when "unlocked" they are easily manually shiftable between extended and retracted positions thereby enabling children, pranksters and other unauthorized personnel to actuate the bolt members from retracted positions to extended, locked positions in those instances wherein the bolt was initially placed in retracted, unlocked position by authorized personnel. Such unauthorized actuation of the bolt results in doors and other closure members being deliberately or unintentionally locked in closed position during those periods of time when they should be unlocked.

Likewise, in those instances in which the surface bolts are vertically mounted to the bottom of the lower portion of a door or other closure member, the slidable bolt members have, on occasion, been accidentally and/or unintentionally shifted from an elevated, retracted, unlocked position to a lowered, extended, locked position, thereby creating undesired and hazardous conditions.

Surface bolts for doors and closures of various kinds have also heretofore been provided with key-actuated locks which are operable for selectively locking the bolts in extended and/or retracted positions wherein the slidable bolt member is shiftable between extended and retracted positions by means of pivotal links which operatively interconnect the slidable bolt to a key-actuated cam such as, by way of example, is illustrated in U.S. Pats. 2,991,643 to Hitt, and 2,969,666 to Muessel.

The prior art likewise discloses surface bolts such as described in U.S. Pat. 2,468,406 to Mora, in which a manually shiftable bolt slidably engages and extends through a fixedly mounted lock housing which includes a key-actuated, rotatable lock cylinder which is selectively movable from and into one or the other of a plurality of semicircular grooves in the slidable bolt for locking it in extended, intermediate, or retracted positions.

Other prior art surface bolts, by reason of their inherent complexities, require skilled labor for installation. There is also the ever-present risk of unsecured parts of the prior art surface bolts being lost or misplaced, although in some instances such parts are enclosed in sub-housings or are otherwise protectively isolated against loss or damage, but at considerable additional cost of labor and material.

The present invention is directed to an improved surface bolt which is manually operable between extended and retracted positions by means of a handle which constitutes a lock housing secured to and carried by the slidable bolt, and wherein the lock housing includes a key-actuated cylinder having means thereon for selectively engaging one or the other of a pair of longitudinally spaced abutments on the mounting base assembly for positively locking the bolt either in extended or retracted position when the key is removed from the lock, thereby effectively precluding accidental, unintentional, or unauthorized actuation of the bolt.

SUMMARY OF THE INVENTION

The present invention desirably simplifies the prior art bolt construction and substantially reduces its cost, weight, and number of constituent parts. By reason of a particularly ingenious arrangement of its parts, application of the bolt to a closure is facilitated and expedited, and requires no mechanical skill.

An object of the invention is to provide an improved surface bolt having simple, durable, trouble-free means for key-locking the slidable bolt member selectively in extended or retracted positions, only when the key has been removed from the lock, the said bolt member being free for sliding movement as long as the key remains in the lock and/or whenever the key is removed from the lock in "unlocked" position.

Another object of the invention is to provide in a surface bolt construction, improved means whereby the bolt may be expeditiously mounted upon a closure member without risk of damage to or loss of internal parts, and when the mounting means itself is internal and concealed within the bolt structure.

Another object of the invention is to provide in a surface bolt construction, internal mechanism which is unusually compact and characterized by great resistance to damage by use and deliberate abuse in service.

Another object of the invention is to provide for quick and easy lock replacement or substitution whenever necessary or desirable, without resort to dismounting of the entire bolt structure from its closure member or support.

A further object of the invention is to provide a structure of the character stated, wherein the manually slidable bolt member is the largest of all the constituent elements employed in the structure.

The foregoing and other objects are attained by the means described herein and illustrated upon the accompanying drawings, in which:

FIG. 5 is a cross section similar to FIG. 4, but showing the slidable bolt member retracted to unlatched position.

FIGS. 6 through 10 are cross sections taken on line 10—10 of FIG. 5, but showing the lock and its cam lugs in various locked and unlocked positions at variance with FIG. 5.

FIG. 11 is a cross section similar to FIG. 4, but showing the strike or keeper mounted on a door frame header according to FIG. 2.

DETAILED DESCRIPTION

Figure 1:
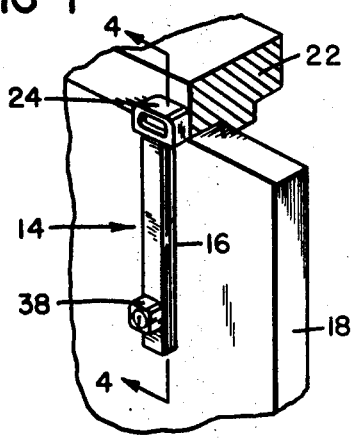
FIG. 1 is a perspective view of the improved surface bolt embodying the present invention, mounted upon a forwardly opening door.

In all of the drawing figures, a longitudinally slidable bolt member is denoted by the numeral 14, whereas the numeral 16 indicates generally a mounting base adapted for fixation to a door or other closure 18, such as, by way of example, by means of screws 20.

The frame for the door includes a header 22 of one kind or another, in accordance with common practice, and to the header may be securely fixed, as by means of screws 23, a strike or keeper 24 into which an end of the bolt member projects when extended, for the purpose of bolting the door in closed position. The strike is preferably of the universal type, adaptable to most conventional forms of headers.

Figure 3:
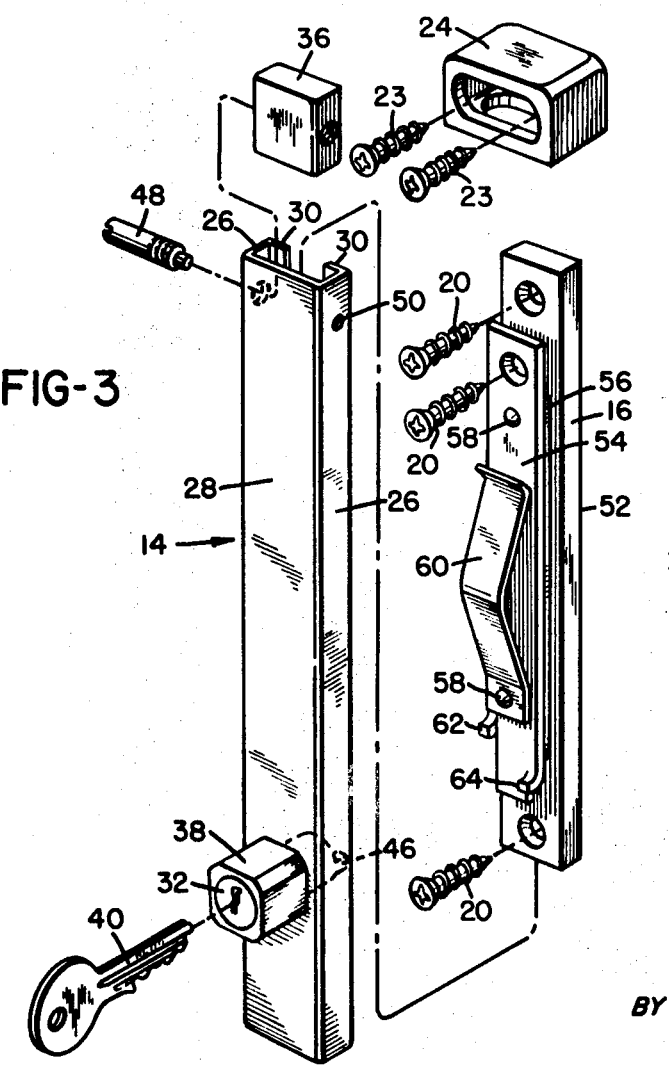
FIG. 3 is an exploded perspective view of the device.

It is noted by reference to FIG. 3, that the manually slidable bolt member 14 is in the form of an elongate rigid metal channel having side walls 26, 26 joined by a web or outer wall 28 disposed at approximate right angles thereto, said side walls terminating as inwardly turned flanges or guide tongues 30, 30. The flanges or tongues 30, 30 are spaced from one another along their length, and reside in a plane which is parallel to web 28. The flanges or tongues preferably extend the full length of the bolt member so as to impart thereto maximum guidance, strength and rigidity.

The bolt member 14 is of the utmost simplicity, in that it carries only a lock 32, and stop members or blocks 34 and 36 at its opposite ends. The lock and the stop blocks are fixed to the bolt member for movement therewith when the bolt member is reciprocated between the extended and retracted positions of FIGS. 4 and 5, respectively.

Lock 32 includes a lock casing 38 which serves also as a handle projecting from web 28, to facilitate manipulation of the bolt member. The lock casing is fixed upon web 28, and supports the lock for rotation by means of a key 40.

The inner end of lock 32 terminates in a rotary cam disc 42 rotatable by means of key 40, said cam disc being provided with a pair of stop lugs 44, 46 fixed to the disc at opposite ends of a diameter thereof. Although the lugs 44, 46 are shown as separate elements in the drawings, they may comprise opposite end portions of a diametral bar fixed upon one face of the disc 42.

Disc 42 may be rotated 90 degrees between the two positions illustrated by FIGS. 8 and 9, wherein the lugs are disposed either in alignment with, or transverse to, the line of reciprocation of bolt member 14.

Lock 32 is one which, by preference, is limited to a 90 degree rotation of the key and disc 42 according to FIGS. 8 and 9, and wherein locking of the disc takes place only when the key is removed from the lock after turning of the key to the upright position of FIG. 9. Whenever the key is in the unlocked or horizontal position of FIG. 8, the lock offers no interference to reciprocatory movements of bolt member 14.

It may here be noted that stop member or block 36 which normally closes one end of the bolt member channel 28, is securely though removably fixed thereto by means of a removable retaining screw 48, portions of which engage not only the stop member but aligned holes 50, 50 in the bolt member flanges. Screw 48 may be removed to release the stop member. Either the upper stop member or the lower stop member may be removable, for a purpose to be explained.

Reference is now made to the mounting base 16, which may be secured to a door or the like by means of screws 20 (FIG. 3). The mounting base comprises a flat elongate base plate 52 of uniform width and thickness, apertured as shown to accommodate the screws 20 which secure the back or rear face of the base plate against a door or the like, as shown.

The reference numeral 54 indicates an elongate substantially flat guide plate having a width dimension gauged to the internal distance between the side walls 26, 26 of bolt member 14, so that the side margins of guide plate 54 slide within the ways provided by the side walls 26 and flanges 30 of the bolt member. To facilitate sliding of the bolt member relative to guide plate 54, the guide plate is spaced from base plate 52 by the interposition of suitable spacing means, herein shown by way of example as an elongate spacer plate 56. Rivets 58, 58 securely fastens the plates 54, 56, and 52 flatwise against one another to produce an integral structure free of moving parts.

Figure 4:
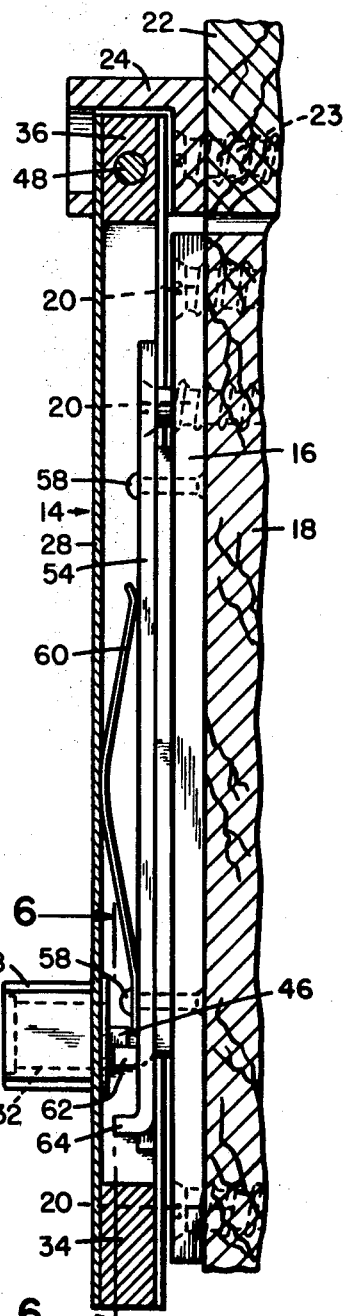
FIG. 4 is an enlarged cross section taken on line 4—4 of FIG. 1, the slidable bolt member being extended to latched position.

The reference numeral 60 indicates an arched leaf spring secured at one end, as by means of rivet 58, to the composite structure comprising plates 52 and 54 and spacing means 56. As is best illustrated in FIG. 4, leaf spring 60 bears yieldingly against the inner face of web 28 to impose light resistance to accidental or unintentional longitudinal shifting of the bolt member relative to mounting base 16.

The mounting base 16 is formed to include a pair of upturned, laterally and longitudinally spaced legs, stationary stops or abutments 62, 64, which are positioned to be engaged by cam lugs 44 and 46 of the lock cam. The stops or abutments 62, 64 may conveniently be struck from the rigid metal of guide plate 54, at a location substantially opposite the key lock lugs 44, 46, to project toward the web 28 of bolt member 14. The stops or abutments 62, 64 are spaced from one another a distance approximating the throw of the bolt member. The lateral spacing of stops 62, 64, approximates the spacing of cam lugs 44, 46 from one another.

In the light of the foregoing explanation, and with reference to FIG. 7, it will be understood that stationary stop 62 serves to intercept and prevent downward linear movement of cam lug 44, and will do so if cam disc 42 is key-locked in the position shown. Similarly, as in FIG. 9, stationary stop 64 intercepts and precludes upward linear movement of cam lug if cam disc 42 is key-locked in the transverse position shown.

Of course, whenever the cam lugs 44 and 46 are aligned with the bolt member axis, as in FIG. 8, the stops 62, 64 offer no interference with longitudinal reciprocation of the bolt member 14 and the lugs 44, 46 carried thereby.

It may here be noted that bolt member 14, being longer and wider than any other element of the assembly, and being provided with the reinforcing advantages of continuous guide flanges 30—30 and side walls 26, 26, ensures great effectiveness and reliability in the function of securely bolting a door or other closure against unauthorized entry. Locking of the bolt member in the operative or extended position further enhances the security and effectiveness of the device. To preclude unauthorized bolting of the door in closed position, bolt member 14 may be key-locked in the retracted position of FIG. 5, wherein stop 64 is shown intercepting upward bodily shifting of lug 46 and bolt member 14 which carries said lug.

OPERATION

The surface bolt of the present invention usually will be available in fully assembled condition, with stop blocks 34 and 36 secured to bolt member 14 at opposite ends thereof. The blocks limit the throw of the bolt member in opposite directions preferably by abutting opposite ends of guide plate 54 incident to reciprocation of the bolt member.

When installation is to be effected, the installer removes the retaining screw 48, which releases stop block 36 for removal thereof from the bolt. When said stop block is removed, bolt member 14 may be slid longitudinally off one end of mounting base 16, thereby to free the mounting base as in FIG. 3. The mounting base may then be placed flatwise against a door or the like 18 according to FIGS. 4, 5 or 11, and secured thereto by means of screws 20 or other fasteners.

Figure 2:
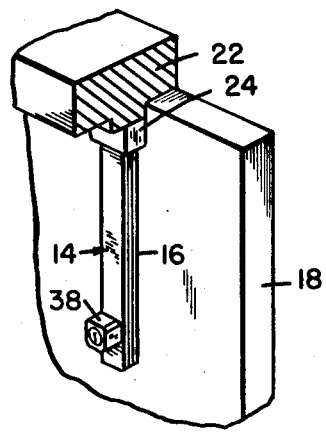
FIG. 2 is a view similar to FIG. 1, showing the same device mounted upon a rearwardly opening door.

After fixation of mounting base 16 upon the face of door 18, the bolt member 14 may be replaced upon the mounting base by sliding it longitudinally onto one end of said base to the extent necessary for re-application of the stop block previously removed. After the stop block is secured by retaining screw 48, bolt member 14 will be captivated and limited as to throw by both stop blocks. The strike 24 then may be located and fixed upon the door frame header in appropriate manner, or as suggested by FIGS. 1 or 2.

With the key 40 inserted fully into lock 32, cam disc 42 is freely rotatable through a 90 degree arc as indicated by full lines and dotted lines upon FIG. 7. That is, manual lowering of bolt member 14 from the FIG. 6 position to the FIG. 8 position, will cause movable cam lug 44 to impinge against stationary stop 62, thereby to effect rotation of cam disc 42 to the approximate position of FIG. 8 at which lugs 44, 46 are free of interference from stops 62, 64. Also, conversely, manual elevating of the bolt member 14 from the FIG. 9 position, will cause cam lug 46 to impinge against stationary stop 64, thereby to effect rotation of cam disc 42 for removing lugs 44, 46 from the sphere of influence of stops 62, 64.

The operation recited in the next preceding paragraph will be materially modified if key 40 is rotated to the locked position of FIG. 6 or FIG. 10, followed by removal of the key from the lock. Thus, in FIG. 6, the disc 42 is locked against rotation, with cam lug 44 overlying stationary stop 62, so that bolt member 14 cannot be lowered from the extended or operative position. In like vein, as to FIG. 10, disc 42 is locked against rotation wherefore any attempt to elevate bolt member 14 to extended position causes lug 46 to impinge against stationary stop 64, thereby to prevent such elevating movement of the bolt member.

From the foregoing explanation, it will be understood that bolt member 14 may be locked in either the extended position or the retracted position, thereby to effectively preclude unauthorized manipulation of the bolt member in every respect. However, if in any situation the bolt member is to be permitted unrestricted freedom of manipulation, key 40 may be turned to the unlocked position of FIG. 8, and may be removed from the lock if desired, to dispose the cam lugs out of interfering relationship with stops 62 and 64 according to FIG. 8, so that bolt member 14 may be unrestrictedly moved between the extended and retracted positions at will.

What is claimed is:

1. In a surface bolt construction, the combination which comprises: an elongate mounting base assembly adapted for surface mounting and including guide means for a bolt member; a longitudinally shiftable elongate hollow bolt member having opposite ends, opposed elongate side walls, and guide means complementing and engageable with the guide means of said mounting base assembly; a key lock carried by and movable with said bolt member, and means including a rotary cam member movable with the key of said lock, for locking the bolt member relative to the mounting base in either an extended operative position or a retracted inoperative position of said bolt member.

2. The combination as defined by claim 1, wherein the means last mentioned is housed within the confines of the hollow bolt member.

3. The combination as defined by claim 1, wherein are included stop members normally fixed at the opposite ends of the bolt member; and stationary means carried by the mounting base assembly to abut said stop members incident to reciprocation of the bolt member along said guide means, for limiting the extent of such reciprocation; at least one of said stop members being displaceable from its normal position at an end of the bolt member.

4. The combination as defined by claim 3, wherein said rotary cam member is bodily movable with and housed within the confines of said hollow bolt member.

5. The combination as defined by claim 1, wherein said lock is of a type which performs no locking function unless the key is removed therefrom.

6. The combination as defined by claim 4, wherein said lock is of a type which performs no locking function unless the key is removed therefrom.

7. The combination as defined by claim 1, wherein is included casing for said lock, said casing being carried by and extended outwardly from said bolt member to serve as a handle to facilitate longitudinal shifting of the bolt member.

8. The combination as defined by claim 1, wherein the width of the bolt member approximates the width of the mounting base assembly, and said bolt member provides a cover for said mounting base assembly.

9. The combination as defined by claim 8, wherein the length of the bolt member exceeds the length of said mounting base assembly.

10. The combination as defined by claim 1, wherein the length of the bolt member exceeds the length of said mounting base assembly.

11. The combintation as defined by claim 3, wherein the length of the bolt member and the width thereof approximate, respectively, the length and the width of the mounting base assembly.

12. The combination as defined by claim 6, wherein the length of the bolt member and the width thereof approximate, respectively, the length and the width of the mounting base assembly.

13. The combination as defined by claim 1, wherein said mounting base assembly comprises a flat elongate base plate having opposite ends; an elongate substantially flat guide plate having opposite side edges and opposite ends, said side edges being spaced apart a distance slightly less than the distance between the side walls of the bolt member for relative longitudinal slidability between said side walls; means fixing the guide plate to said base plate with said side edges of the guide plate spaced from the base plate; said means for locking the bolt member comprising a pair of stationary stops on the guide plate spaced apart a distance approximating the throw of the bolt member, said stationary stops being located for selective engagement with portions of said rotary cam member incident to manual shifting of the bolt member.

14. The combination as defined by claim 13, wherein is included a leaf spring fixed upon said guide plate for yielding abutment upon an interior wall surface of the hollow bolt member.

15. The combination as defined by claim 13, wherein said stationary stops are in the form of integral lugs struck from the material of said guide plate and projected in a direction away from the plane of the base plate.

16. The combination as defined by claim 13, wherein are included stop members normally fixed at the opposite ends of the bolt member; said opposite ends of the guide plate being in the path of movement of said stop members to limit shiftability of the bolt member in opposite directions; at least one of said stop members being displaceable from its normal position at an end of the bolt member.

17. The combination as defined by claim 15, wherein said lock is of a type which performs no locking function unless the key is removed therefrom.

18. The combination as defined by claim 16, wherein said lock is of a type which performs no locking function unless the key is removed therefrom.

19. The combination as defined by claim 18, wherein is included a casing for said lock, said casing being carried by and extended outwardly from said bolt member to serve as a handle to facilitate longitudinal shifting of the bolt member.

20. The combination as defined by claim 18, wherein the width of the bolt member approximates the width of the mounting base assembly and provides a cover therefor.

21. The combination as defined by claim 20, wherein the length of the bolt member exceeds the length of said mounting base assembly.

22. The combination as defined by claim 18, wherein the length of the bolt member and the width thereof approximate, respectively, the length and the width of the mounting base assembly.

References Cited

UNITED STATES PATENTS

| | | | |
|---|---|---|---|
| 1,892,447 | 12/1932 | Carr | 70—81 |
| 2,100,622 | 11/1937 | Adams | 292—147 |
| 2,620,213 | 12/1952 | Keeler | 292—147 |
| 2,991,643 | 7/1961 | Hitt | 70—134 |
| 3,371,511 | 3/1968 | Atkinson | 70—71 |

ROBERT L. WOLFE, Primary Examiner

U.S. Cl. X.R.

70—389; 292—145